US009952828B2

(12) United States Patent
Chen (10) Patent No.: US 9,952,828 B2
(45) Date of Patent: Apr. 24, 2018

(54) WLAN PLAYER AND WLAN SYSTEM FOR SYNCHRONIZING PLAYING SPEED AND METHOD THEREOF

(71) Applicant: ALi Corporation, Hsinchu (TW)

(72) Inventor: Yue-Yong Chen, Guangdong (CN)

(73) Assignee: ALi Corporation, Hsinchu (TW)

( * ) Notice: Subject to any disclaimer, the term of this patent is extended or adjusted under 35 U.S.C. 154(b) by 0 days.

(21) Appl. No.: 15/291,954

(22) Filed: Oct. 12, 2016

(65) Prior Publication Data

US 2017/0286054 A1    Oct. 5, 2017

(30) Foreign Application Priority Data

Mar. 29, 2016 (CN) .......................... 2016 1 0185983

(51) Int. Cl.
*G06F 3/16* (2006.01)
*H04W 84/12* (2009.01)

(52) U.S. Cl.
CPC ............ *G06F 3/165* (2013.01); *H04W 84/12* (2013.01)

(58) Field of Classification Search
CPC ........... G06F 3/165; G10L 21/04; H04R 3/12; H04L 12/185; H04L 65/4015
USPC ..... 348/14.08, 515, 738; 370/205, 338, 432, 370/505; 375/134, 219; 381/79, 109; 700/94; 386/207, 239, 338; 455/127.1; 709/231, 248
See application file for complete search history.

(56) References Cited

U.S. PATENT DOCUMENTS

| | | | |
|---|---|---|---|
| 5,832,024 A * | 11/1998 | Schotz | H04B 1/04 370/324 |
| 8,208,787 B2 * | 6/2012 | Park | H04N 21/41415 386/239 |
| 8,234,395 B2 | 7/2012 | Millington | |
| 8,626,952 B2 * | 1/2014 | Robbin | G06F 1/1613 381/104 |
| 8,707,077 B2 | 4/2014 | Knowles | |
| 8,737,819 B2 * | 5/2014 | Chung | H04N 5/775 386/338 |
| 9,106,430 B1 * | 8/2015 | Zhou | H04N 21/26616 |
| 9,712,573 B2 * | 7/2017 | Sheth | H04L 65/4015 |

(Continued)

FOREIGN PATENT DOCUMENTS

CN        103581816       2/2014

*Primary Examiner* — Gerald Gauthier
(74) *Attorney, Agent, or Firm* — J. C. Patents (57) ABSTRACT

A WLAN player for synchronizing playing speed includes a speed adjusting module, which is adapted to adjust a speed that the WLAN player plays a medium according to a first playing-progress value and a first clock value of another WLAN player, so as to synchronously play the medium together with said another WLAN player. The WLAN player has a second playing-progress value and a second clock value. The speed adjusting module is configured to calculate a progress difference between the second playing-progress value and the first playing-progress value; calculate a time difference between the second clock value and the first clock value; calculate a specific progress difference according to the progress difference and the time difference; and adjust the speed that the WLAN player plays the medium according to the specific progress difference. In this way, a synchronization error between the WLAN players is effectively decreased.

9 Claims, 5 Drawing Sheets

(56) References Cited

U.S. PATENT DOCUMENTS

| | | | | |
|---|---|---|---|---|
| 2005/0286546 | A1* | 12/2005 | Bassoli | G11B 27/002 370/432 |
| 2007/0149150 | A1* | 6/2007 | Miyazaki | H04B 1/16 455/127.1 |
| 2007/0297459 | A1* | 12/2007 | Cucos | H04J 3/07 370/505 |
| 2008/0031210 | A1* | 2/2008 | Abhishek | H04W 8/005 370/338 |
| 2009/0323987 | A1* | 12/2009 | Yang | H03G 1/02 381/109 |
| 2010/0104255 | A1* | 4/2010 | Yun | H04N 5/765 386/207 |
| 2011/0066746 | A1* | 3/2011 | Bennett | H04N 21/26616 709/231 |
| 2012/0206650 | A1* | 8/2012 | Lin | H04N 5/60 348/515 |
| 2013/0021535 | A1* | 1/2013 | Kim | H04N 21/4122 348/738 |
| 2013/0114653 | A1* | 5/2013 | Schweikhardt | G11B 27/10 375/219 |
| 2014/0009564 | A1* | 1/2014 | Cleve | H04M 3/002 348/14.08 |
| 2016/0196106 | A1* | 7/2016 | Hammer | H04R 3/12 381/79 |
| 2017/0069338 | A1* | 3/2017 | Elliot | G10L 21/04 |
| 2017/0277507 | A1* | 9/2017 | Ando | G06F 3/165 |
| 2017/0286054 | A1* | 10/2017 | Chen | H04W 84/12 |
| 2017/0303042 | A1* | 10/2017 | Hammer | H04J 3/06 |

\* cited by examiner

WLAN PLAYER AND WLAN SYSTEM FOR SYNCHRONIZING PLAYING SPEED AND METHOD THEREOF

CROSS-REFERENCE TO RELATED APPLICATION

This application claims the priority benefit of China application serial no. 201610185983.X, filed on Mar. 29, 2016. The entirety of the above-mentioned patent application is hereby incorporated by reference herein and made a part of this specification.

BACKGROUND OF THE INVENTION

Field of the Invention

The invention relates to a wireless local area network (WLAN) player, and particularly relates to a WLAN player, a system and a method for synchronizing playing speed.

Description of Related Art

Along with development of technology, players (for example, a speaker) having a wireless transmission function are widely applied, and people may connect a plurality of different players by using the wireless transmission function of a WLAN, such that the different players may output a same medium file.

However, since human ears are very sensitive to synchronization of various sound channels, when the players respectively play a plurality of sound channels of a same work, these players probably cause auditory discomfort of the user due to out-of-sync of used crystal oscillators. Generally, an average distance between a left ear and a right ear of human being is about 20 cm, and a sound wave requires about 600 µs to pass through such distance. In this case, in order to avoid the auditory discomfort of the user, it is required to control a synchronization error of the players to be within 10% (i.e. 60 µs), such that people may neglect the synchronization error.

Therefore, it is one of important issues concerned by related technicians to develop a method capable of effectively decreasing the synchronization error between a plurality of players.

SUMMARY OF THE INVENTION

Accordingly, the invention is directed to a WLAN player, a system and a method for synchronizing playing speed. The WLAN player for synchronizing playing speed is capable of adjusting a self-medium play speed according to a playing-progress value and a WLAN clock value of another WLAN player. In this way, the WLAN player is not only able to check whether the WLAN clock value thereof is synchronous to that of another player, but is also able to adjust the playing-progress value in case that the WLAN clock values are synchronous, so as to effectively decrease a synchronization error with another WLAN player.

According to one of the exemplary embodiments, the disclosure proposes a WLAN player for synchronizing playing speed including a speed adjusting module, which is adapted to adjust a speed that the WLAN player plays a medium according to a first playing-progress value and a first clock value of another WLAN player, so as to synchronously play the medium together with another WLAN player. The first playing-progress value is a progress that another WLAN player plays the medium, and the first clock value is a self-WLAN-clock value of another WLAN player. The WLAN player has a second playing-progress value and a second clock value, where the second playing-progress value is a progress that the WLAN player plays the medium, and the second clock value is a self-WLAN-clock value of the WLAN player. The speed adjusting module is configured to calculate a progress difference between the second playing-progress value and the first playing-progress value; calculate a time difference between the second clock value and the first clock value; calculate a specific progress difference according to the progress difference and the time difference; and adjust the speed that the WLAN player plays the medium according to the specific progress difference.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

FIG. 4A to FIG. 4C are synchronization performance simulation diagrams obtained by setting Filter_coef1 and Filter_coef2 of FIG. 2 to different values.

DESCRIPTION OF EMBODIMENTS

In order to decrease a synchronization error of a plurality of players capable of transmitting signals through a WLAN manner for playing medium, an embodiment of the invention provides a method synchronizing playing speed, by which a WLAN player may adjust a self-medium playing speed according to a playing-progress value and a WLAN clock value of another WLAN player, so as to synchronously play the medium together with another WLAN player. The WLAN player calculates a specific progress difference according to a difference between the playing-progress values of the two WLAN players and a difference between the WLAN clock values of the two WLAN players, so as to synchronize the WLAN players.

Moreover, embodiments of the invention further disclose a WLAN player and a WLAN playing system using the aforementioned method for synchronizing the playing speed. In order to fully convey the spirit of the invention, embodiments of the invention are provided below for detailed descriptions.

Figure 1:
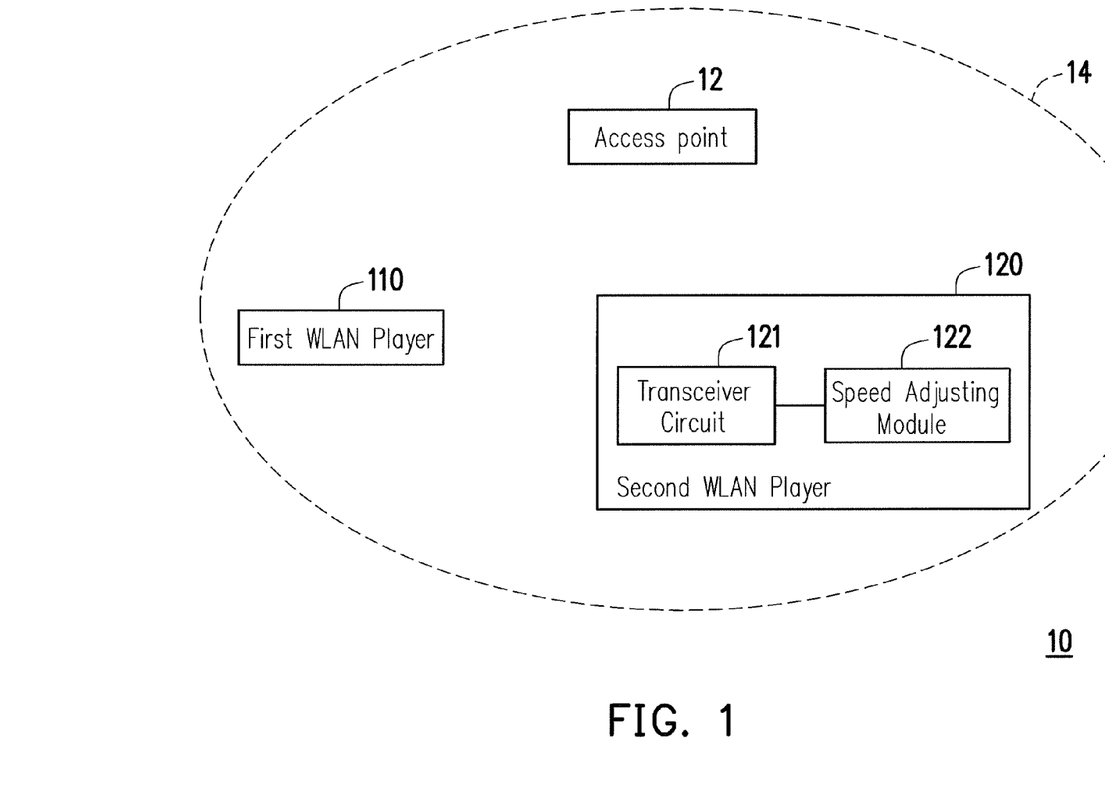
FIG. 1 is a block schematic diagram of a WLAN playing system having a synchronous playing speed according to an embodiment of the invention.

FIG. 1 is a block schematic diagram of a WLAN playing system having a synchronous playing speed according to an embodiment of the invention. In the present embodiment, the WLAN playing system 10 includes a first WLAN player 110, a second WLAN player 120 and an access point (AP) 12. It should be noted that the number of the first WLAN player 110 and the second WLAN player 120 can be adjusted according to an actual practise. For example, in an embodiment, the WLAN playing system 10 may include more WLAN players, which is not limited by the invention.

In an embodiment, the first WLAN player 110 and the second WLAN player 120 are multimedia output devices/players having the same or similar functions, and both have a WLAN function. For example, the first WLAN player 110 and the second WLAN player 120 can be multimedia players having a sound and image output function such as smart phones, tablet personal computers, notebooks, desktop computers and smart TVs, etc. Alternatively, in another embodiment, the first WLAN player 110 and the second WLAN player 120 can also be multimedia players only having a sound or image output function such as displays or speakers, etc., for example, WLAN speakers, etc. In other embodiments, it is assumed that the WLAN playing system 10 is a sound system, and the first WLAN player 110 and the second WLAN player 120 can be respectively a left/right channel audio output device or a right/left channel audio output device. Alternatively, in an embodiment, the first WLAN player 110 and the second WLAN player 120 can also be multimedia players used for playing a same sound channel and/or a single image.

In terms of an actual practise, the first WLAN player 110 and the second WLAN player 120 can be placed in a same space or different spaces. For example, the first WLAN player 110 and the second WLAN player 120 can be respectively disposed in one or a plurality of rooms of a house or on one or a plurality of floors of the house, which is not limited by the invention.

In the present embodiment, the first WLAN player 110 and the second WLAN player 120 are all located within a wireless signal coverage range 14 of the AP 12, and may implement a wireless transmission operation and wireless network access operation through a WLAN provided by the AP 12. In other words, the first WLAN player 110, the second WLAN player 120 and the AP 12 construct a basic service set (BSS). In the present embodiment, in the BSS shown in FIG. 1, the first WLAN player 110 can be a master player, and the second WLAN player 120 can be a slave player. In another embodiment, the first WLAN player 110 and the second WLAN player 120 can also be belonged to different WLANs, i.e. belonged to different independent BSSs (IBSS), though the invention is not limited thereto.

In the present embodiment, the second WLAN player 120 at least includes a transceiver circuit 121 and a speed adjusting module 122. The transceiver circuit 121 has a general network interface function, and is configured to transmit and/or receive wireless signals to/from the first WLAN player 110 through the WLAN provided by the AP 12.

Figure 2:
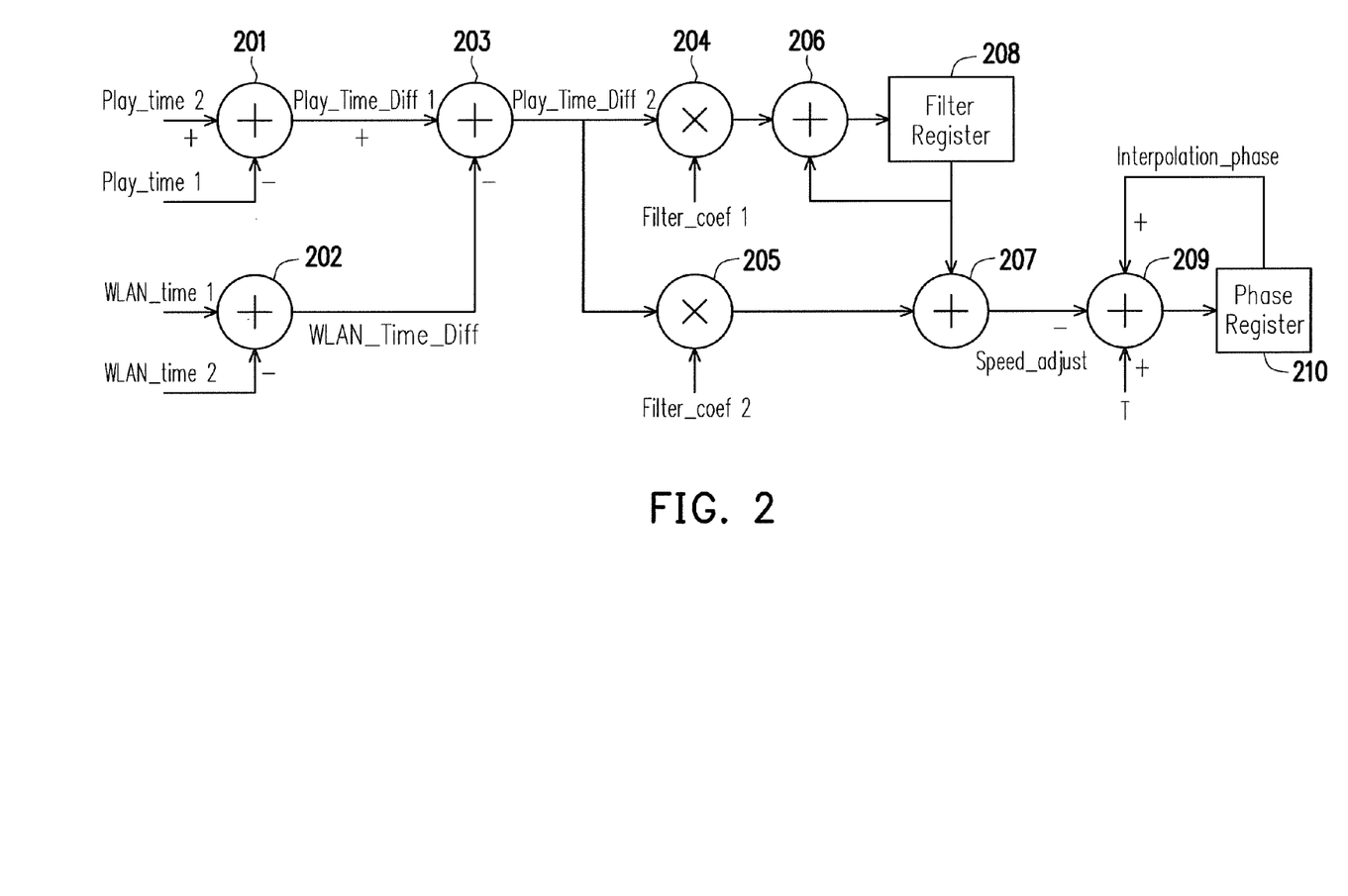
FIG. 2 is a block schematic diagram of a speed adjusting module according to an embodiment of the invention.

The speed adjusting module 122 is connected to the transceiver circuit 121, and can be a hardware device, a software device having a computation and processing capability, or a combination of the hardware device and the software device, and is adapted to execute the method for synchronizing playing speed provided by the invention. In an embodiment, the speed adjusting module 122 can be implemented as a structure shown in FIG. 2 to execute the method for synchronizing playing speed provided by the invention. FIG. 2 is a block schematic diagram of a speed adjusting module according to an embodiment of the invention. In the present embodiment, elements in the second WLAN player 120 at least include a plurality of adders (for example, elements 201, 202, 203, 206, 207, 209), a plurality of multipliers (for example, elements 204, 205), a filter register (for example, a element 208) and a phase register (for example, a element 210), though the elements included in the second WLAN player 120 are not limited by the invention.

Figure 3:
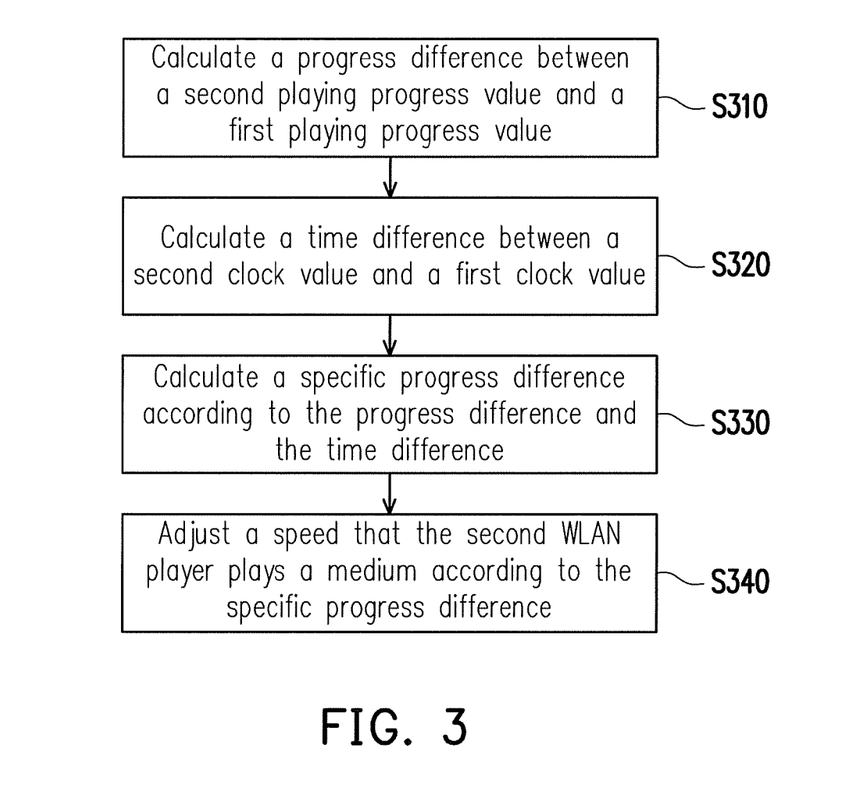
FIG. 3 is a flowchart illustrating a method for synchronizing playing speed according to an embodiment of the invention.

FIG. 3 is a flowchart illustrating a method for synchronizing playing speed according to an embodiment of the invention. Referring to FIG. 1-FIG. 3, the steps of the method shown in FIG. 3 are executed by the elements shown in FIG. 2 that are included in the second WLAN player 120 of FIG. 1.

First, in an embodiment, when the first WLAN player 110 and the second WLAN player 120 synchronously play a same medium (for example, an audio file), the first WLAN player 110 sends a first playing-progress value Play_time1 and a first clock value WLAN_time1 of itself to the second WLAN player 120 every a period of time. The first playing-progress value Play_time1 is a progress value (for example, a current playing time of the medium) that the first WLAN player 110 plays the medium, and the first clock value WLAN_time1 is a self-WLAN-clock value of the first WLAN player 110. Besides, the second WLAN player 120 has a second playing-progress value Play_time2 and a second clock value WLAN_time2, where the second playing-progress value Play_time2 is a progress value (for example, a current playing time of the medium) that the second WLAN player 120 plays the medium, and the second clock value WLAN_time2 is a self-WLAN-clock value of the second WLAN player 120.

It should be noted that the aforementioned WLAN clock values are clocks freely run by the first WLAN player 110 and the second WLAN player 120 in physical layers, which can be reset according to a timing beacon provided by a physical layer clock of the AP 12, so as to be synchronous to the timing beacon of the AP 12 in a received WLAN signal. For example, the first WLAN player 110 and the second WLAN player 120 may have a timing synchronization function (TSF) specified by a 802.11 wireless communication standard, so as to be synchronous to the physical layer clock of the AP 12 through the TSF.

Referring to FIG. 3, in step S310, the speed adjusting module 122 calculates a progress difference Play_Time_Diff1 between the second playing-progress value Play_time2 and the first playing-progress value Play_time1.

In the present embodiment, the speed adjusting module 122 calculates the progress difference Play_Time_Diff1 between the second playing-progress value and the first playing-progress value (i.e. Play_Time_Diff1=Play_time2−Play_time1) by using the element 201 to subtract the second playing-progress value Play_time2 of the second WLAN player 120 by the first playing-progress value Play_time1 of the first WLAN player 110 (as shown in FIG. 2).

Then, in step S320, the speed adjusting module 122 calculates a time difference WLAN_Time_Diff between the second clock value WLAN_time2 and the first clock value WLAN_time1.

In the present embodiment, the speed adjusting module 122 calculates the time difference WLAN_Time_Diff between the second clock value WLAN_time2 and the first clock value WLAN_time1 (i.e. WLAN_Time_Diff= WLAN_time2−WLAN_time1) by using the element 202 to subtract the second clock value WLAN_time2 by the first clock value WLAN_time1 (as shown in FIG. 2).

In step S330, the speed adjusting module 122 calculates a specific progress difference Play_Time_Diff2 according to the progress difference Play_Time_Diff1 and the time difference WLAN_Time_Diff.

In the present embodiment, the speed adjusting module 122 calculates the specific progress difference Play_Time_Diff2 (i.e. Play_Time_Diff2=Play_Time_diff1−WLAN_Time_Diff) by using the element 203 to subtract the time difference WLAN_Time_Diff by the progress difference Play_Time_Diff1 (shown in FIG. 2).

In another embodiment, before calculating the specific progress difference Play_Time_Diff2, the speed adjusting module 122 further determines whether the time difference WLAN_Time_Diff is between 0 and a predetermined value (for example, a positive real number). If yes, the speed adjusting module 122 further calculates the specific progress difference Play_Time_Diff2.

Conversely, if the time difference WLAN_Time_Diff is not between 0 and the predetermined value, the speed adjusting module 122 may directly set the time difference WLAN_Time_Diff to 0 through another device (not shown) set between the elements 202 and 203, such that the specific progress difference Play_Time_Diff2 output by the element 203 is equal to the progress difference Play_Time_Diff1 (i.e. to set Play_Time_Diff2=Play_Time_Diff1). To be specific, if the time difference WLAN_Time_Diff is not between 0 and the predetermined value, it generally means that the first WLAN player 110 and the second WLAN player 120 are located in different regions and cannot be connected to the same BSS, which causes out-of-sync of the first WLAN player 110 and the second WLAN player 120. Since playing synchronization of different rooms is unnecessary to be within 100 µs, the time difference WLAN_Time_Diff can be directly set to 0 through another device, and the element 203 may directly set the specific progress difference Play_Time_Diff2 to be the progress difference Play_Time_Diff1.

Then, in step S340, the speed adjusting module 122 adjusts a speed that the second WLAN player 120 plays the medium according to the specific progress difference Play_Time_Diff2.

In the present embodiment, the speed adjusting module 122 may use the element 204 to multiply the specific progress difference Play_Time_Diff2 by a first filter coefficient Filter_coef1, and use the element 206 to add the output of the element 204 and a filter register value Filter_Reg output by the device 208 to update the filter register value (i.e. Filter_Reg=Filter_Reg+Play_Time_Diff2×Filter_coef1) (as shown in FIG. 2). Namely, the speed adjusting module 122 may update the filter register value Filter_Reg output by the element 208 according to the specific progress difference Play_Time_Diff2 and the first filter coefficient Filter_coef1. Moreover, the speed adjusting module 122 uses the element 205 to multiply the specific progress difference Play_Time_Diff2 by a second filter coefficient Filter_coef2, and uses the element 207 to add the output of the element 205 and the updated filter register value Filter_Reg to obtain a speed adjusting value Speed_adjust (i.e. Speed_adjust=Filter_Reg+Play_Time_Diff2×Filter_coef2) (as shown in FIG. 2). It should be noted that the first filter coefficient Filter_coef1 and the second filter coefficient Filter_coef2 are respectively a non-zero real number.

Then, the speed adjusting module 122 adjusts the speed that the second WLAN player 120 plays the medium according to the speed adjusting value Speed_adjust. It should be noted that the speed adjusting module 122 may execute an interpolation operation, or the speed adjusting module 122 may interpolate or delete some data to implement adjusting the speed that the second WLAN player 120 plays the medium. To be specific, the second WLAN player 120 may first detect sound data to be played, and interpolate or delete data at a place with smaller sound signal amplitude. In the present embodiment, the speed adjusting module 122 may update an interpolation phase Interpolation_phase of the element 210 according to the speed adjusting value Speed_adjust calculated based on the specific progress difference Play_Time_Diff2 and a sampling period T of the medium, so as to interpolate the medium according to the interpolation phase Interpolation_phase to adjust the speed that the second WLAN player 120 plays the medium (as shown in FIG. 2). It should be noted that the aforementioned sampling period is a time represented by an audio sampling point. In the present embodiment, the speed adjusting module 122 uses the element 209 to calculate "Interpolation_phase=T+Interpolation_phase−Speed_adjust" to update the interpolation phase Interpolation_phase. Then, the speed adjusting module 122 interpolates the medium according to the interpolation phase Interpolation_phase, so as to adjust the speed that the second WLAN player 120 plays the medium. In this way, the second WLAN player 120 may effectively adjust the self-medium playing speed to decrease the synchronization error with the first WLAN player 110.

For example, it is assumed that a WLAN beacon interval of the AP 12 is 100 ms, if a difference between the clock values of the AP 12 and the first WLAN player 110 is 100 ppm, an accumulative difference of the first WLAN player 110 between two beacons is 10 µs. The first WLAN player 110 saves the first clock value and the first playing-progress value when receiving the beacon, and sends information containing the above two values to the second WLAN player 120. Since the second WLAN player 120 can be synchronized to the WLAN clock of the AP 12 when receiving the beacon, the accumulative difference of the second WLAN player 120 between two beacons can be eliminated by saving the just updated first clock value and the corresponding first playing-progress value of the first WLAN player 110.

In order to further fully convey the spirit of the invention, an audio signal with a sampling frequency of 44.1K is taken as an example for description. In an embodiment of the invention, the time corresponding to a sampling point of the audio signal with the sampling frequency of 44.1K is 22.7 µs. Namely, if an accuracy of a player progress is the time of one sampling point, the synchronization error is greater than 22.7 µs. In order to break through such limitation, the hardware of the player may use a upsampling clock (e.g., generally 128 or 256 times) of a digital-to-analog converter (DAC) to further decrease the synchronization error.

Figure 4A:
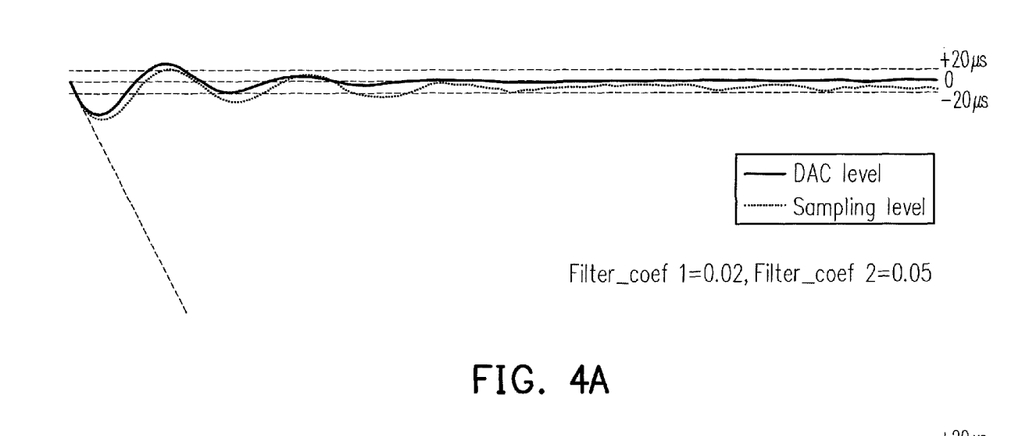
Figure 4B:
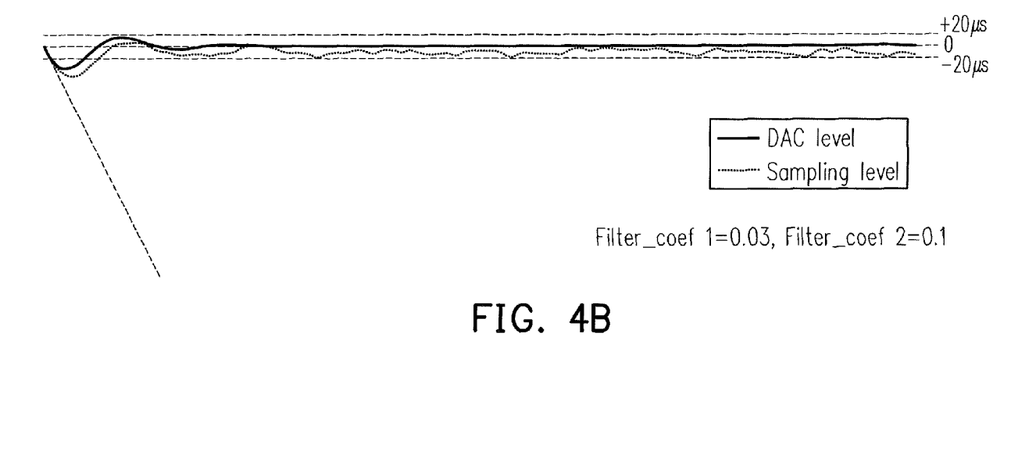
Figure 4C:
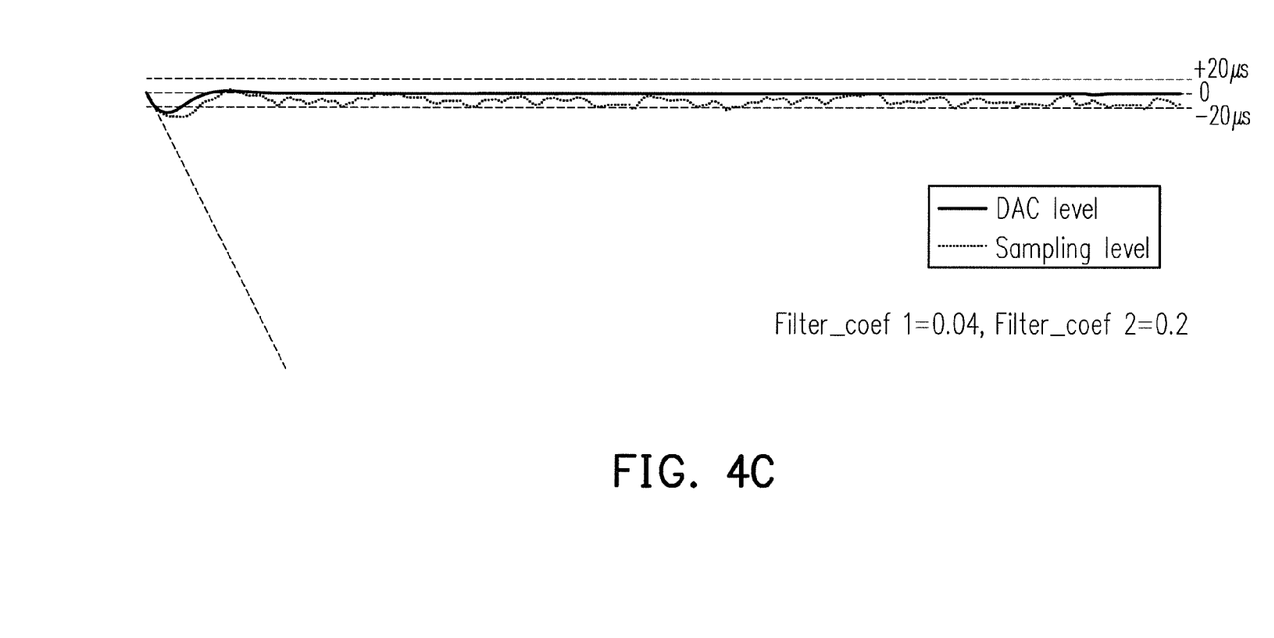

FIG. 4A to FIG. 4C are synchronization performance simulation diagrams obtained by setting Filter_coef1 and Filter_coef2 of FIG. 2 to different values. Referring to FIG. 4A to FIG. 4C, the three parallel lines respectively represent reference values of +20/0/−20 µs, and the oblique line (extending to infinity) represents error without synchronization.

First, referring to FIG. 4A, the filter coefficients Filter_coef1 and Filter_coef2 are 0.02 and 0.05 respectively. According to FIG. 4A, it shows that the synchronization errors of a "sampling level" (i.e. the accuracy of the second WLAN player 120 is a time of one sampling point) and a "DAC level" (i.e. the accuracy of the second WLAN player 120 is the sampling clock of the DAC) are substantially smaller than 20 µs. Moreover, the synchronization error of the "DAC level" is substantially lower than that of the "sampling level".

Moreover, the filter coefficients Filter_coef1 and Filter_coef2 in FIG. 4B are respectively 0.03 and 0.1, and the filter coefficients Filter_coef1 and Filter_coef2 in FIG. 4C are respectively 0.04 and 0.2. Similar to FIG. 4A, in FIG. 4B and FIG. 4C, the synchronization errors of both of the "DAC level" and the "sampling level" are substantially smaller than 20 µs.

In summary, the embodiments of the invention provide a WLAN player, a system and a method for synchronizing playing speed. The provided WLAN player may adjust a self-medium playing speed according to the playing-progress value and the WLAN clock value of another player. In this way, the WLAN player is not only able to check whether the WLAN clock value thereof is synchronous to that of another player, but is also able to adjust the playing-progress value in case that the WLAN clock values are synchronous, so as to effectively decrease the synchronization error with another WLAN player.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A wireless local area network (WLAN) player for synchronizing playing speed, comprising:
   a speed adjusting module, adapted to adjust a speed that the wireless local area network player plays a medium according to a first playing-progress value and a first clock value of another WLAN player, so as to synchronously play the medium together with said another WLAN player,
   wherein the first playing-progress value is a progress that said another WLAN player plays the medium, and the first clock value is a self-WLAN-clock value of said another WLAN player,
   wherein the WLAN player has a second playing-progress value and a second clock value, the second playing-progress value is a progress that the WLAN player plays the medium, and the second clock value is a self-WLAN-clock value of the WLAN player,
   wherein the speed adjusting module is configured to:
   calculate a progress difference between the second playing-progress value and the first playing-progress value;
   calculate a time difference between the second clock value and the first clock value;
   calculate a specific progress difference according to the progress difference and the time difference; and
   adjust the speed that the WLAN player plays the medium according to the specific progress difference.

2. The WLAN player for synchronizing playing speed as claimed in claim 1, wherein the time difference is a value obtained by subtracting the first clock value by the second clock value, and the speed adjusting module is further configured to:
   determine whether the time difference is between 0 and a predetermined value;
   if yes, calculate the specific progress difference according to the progress difference and the time difference;
   if no, set the progress difference as the specific progress difference; and
   adjust the speed that the WLAN player plays the medium according to the specific progress difference.

3. The WLAN player for synchronizing playing speed as claimed in claim 1, wherein the speed adjusting module is configured to:
   update a filter register value according to the specific progress value and a first filter coefficient;
   multiply the specific progress value by a second filter coefficient for adding to the updated filter register value to obtain a speed adjusting value;
   update an interpolation phase according to the speed adjusting value and a sampling period of the medium; and
   interpolate the medium according to the interpolation phase to adjust the speed that the WLAN player plays the medium.

4. A WLAN playing system for synchronizing playing speed, comprising:
   a first WLAN player; and
   a second WLAN player, synchronously playing a same medium together with the first WLAN player,
   wherein the second WLAN player adjusts a speed that the second WLAN player plays the medium according to a first playing-progress value and a first clock value of the first WLAN player, so as to synchronously play the medium together with the first WLAN player,
   wherein the first playing-progress value is a progress that the first WLAN player plays the medium, and the first clock value is a self-WLAN-clock value of the first WLAN player,
   wherein the second WLAN player has a second playing-progress value and a second clock value, the second playing-progress value is a progress that the second WLAN player plays the medium, and the second clock value is a self-WLAN-clock value of the second WLAN player,
   wherein the second WLAN player is configured to:
   calculate a progress difference between the second playing-progress value and the first playing-progress value;
   calculate a time difference between the second clock value and the first clock value;
   calculate a specific progress difference according to the progress difference and the time difference; and
   adjust the speed that the second WLAN player plays the medium according to the specific progress difference.

5. The WLAN playing system for synchronizing playing speed as claimed in claim 4, wherein the time difference is a value obtained by subtracting the first clock value by the second clock value, and the second WLAN player is further configured to:
   determine whether the time difference is between 0 and a predetermined value;
   if yes, calculate the specific progress difference according to the progress difference and the time difference;
   if no, set the progress difference as the specific progress difference; and
   adjust the speed that the second WLAN player plays the medium according to the specific progress difference.

6. The WLAN playing system for synchronizing playing speed as claimed in claim 4, wherein the second WLAN player is configured to:
   update a filter register value according to the specific progress value and a first filter coefficient;
   multiply the specific progress value by a second filter coefficient for adding to the updated filter register value to obtain a speed adjusting value;
   update an interpolation phase according to the speed adjusting value and a sampling period of the medium; and interpolate the medium according to the interpolation phase to adjust the speed that the second WLAN player plays the medium.

7. A method for synchronizing playing speed, adapted to a WLAN playing system comprising a plurality of WLAN players, comprising:

sending a first playing-progress value and a first clock value of a first WLAN player by the first WLAN player in the plurality of WLAN players, wherein the other WLAN players synchronously play a same medium together with the first WLAN player; and adjusting a speed that the other WLAN players play the medium by the other WLAN players according to the first playing-progress value and the first clock value of the first WLAN player, so as to synchronously play the medium together with the first WLAN player, wherein the first playing-progress value is a progress that the first WLAN player plays the medium, and the first clock value is a self-WLAN-clock value of the first WLAN player, wherein the other WLAN players respectively have a second playing-progress value and a second clock value, the second playing-progress value is a progress that the other WLAN players respectively play the medium, and the second clock value is an individual WLAN clock value of the other WLAN players, wherein the step of adjusting the speed that the other WLAN players play the medium by the other WLAN players according to the first playing-progress value and the first clock value of the first WLAN player comprises:

respectively calculating a progress difference between the second playing-progress value and the first playing-progress value by the other WLAN players;

respectively calculating a time difference between the second clock value and the first clock value by the other WLAN players;

respectively calculating a specific progress difference by the other WLAN players according to the progress difference and the time difference; and respectively adjusting the speed that the other WLAN players respectively play the medium by the other WLAN players according to the specific progress difference.

8. The method for synchronizing playing speed as claimed in claim 7, wherein the time difference is a value obtained by subtracting the first clock value by the second clock value, and before the step of respectively calculating the specific progress difference by the other WLAN players according to the progress difference and the time difference, the method further comprises:

respectively determining whether the time difference is between 0 and a predetermined value by the other WLAN players;

if yes, respectively calculating the specific progress difference by the other WLAN players according to the progress difference and the time difference, and adjusting the speed that the other WLAN players respectively play the medium according to the specific progress difference;

if no, respectively setting the progress difference as the specific progress difference by the other WLAN players, and adjusting the speed that the other WLAN players respectively play the medium according to the specific progress difference.

9. The method for synchronizing playing speed as claimed in claim 7, wherein the WLAN players are respectively configured to:

updating a filter register value according to the specific progress value and a first filter coefficient;

multiplying the specific progress value by a second filter coefficient for adding to the updated filter register value to obtain a speed adjusting value;

updating an interpolation phase according to the speed adjusting value and a sampling period of the medium; and interpolating the medium according to the interpolation phase to adjust the speed that the other WLAN players respectively play the medium.

* * * * *